June 29, 1971  A. G. RUIZ  3,589,008
LAWN TRIMMER FOR SPRINKLER HEAD
Filed Jan. 14, 1969

INVENTOR
ALFONSO G. RUIZ

United States Patent Office 3,589,008
Patented June 29, 1971

3,589,008
LAWN TRIMMER FOR SPRINKLER HEAD
Alfonso G. Ruiz, 5636 Archcrest Drive,
Los Angeles, Calif. 90043
Filed Jan. 14, 1969, Ser. No. 790,996
Int. Cl. B26b 3/00
U.S. Cl. 30—310                                   6 Claims

ABSTRACT OF THE DISCLOSURE

A sprinkler head cup, adapted to be placed on the top of a sprinkler head on a lawn; structure projecting upward from the top of the aforesaid sprinkler head cup, the structure embodying a screw in the center of the cup, the screw passing through the center of a shaft on which is placed a cylindrical spacer; an enlarged end of a handle; a second cylindrical spacer; and a knob that is secured to the upper end of the screw. The aforesaid handle is provided with an integrally-formed grass-trimmer blade holder in which is located the aforesaid trimmer blade which is held in place in the holder by means of a screw and wing nut. The trimmer blade and its holder may be at approximately thirty degrees to the aforesaid handle.

---

This invention relates to lawn trimmers; more particularly, to a lawn trimmer that is placed on the top of a sprinkler head for the purpose of trimming the grass close to the sprinkler head that is partially imbedded in the ground where it is almost impossible to reach the grass around the head with any other type of trimmer without danger of damaging either the trimmer and/or the sprinkler head.

It is the principal object of this invention to provide a lawn trimmer for sprinkler heads that can be placed on the top of the head of the sprinkler and manually rotated in a clockwise direction, thus trimming the grass around the sprinkler head right up to the head in a minimum of time and with a minimum of effort.

Another object of this invention is to provide a lawn trimmer for sprinkler heads that can be used on any sprinkler head without having to make any adjustments on either the head or the trimmer.

Still another object of this invention is to provide a lawn trimmer for sprinkler heads that has a removable blade which can be replaced by the removal of one screw for sharpening of the blade whenever the blade becomes dull.

With these and other objects in view, as will appear hereinafter, my invention consists of certain novel features of construction, combination, and arrangement of parts and portions as will hereinafter be described in detail, reference being had to the accompanying drawing, in which.

In the several views of the drawing, like parts of this invention are indicated by like reference numbers.

The reference number 5 indicates the lawn trimmer in its entirety.

Figure 2:
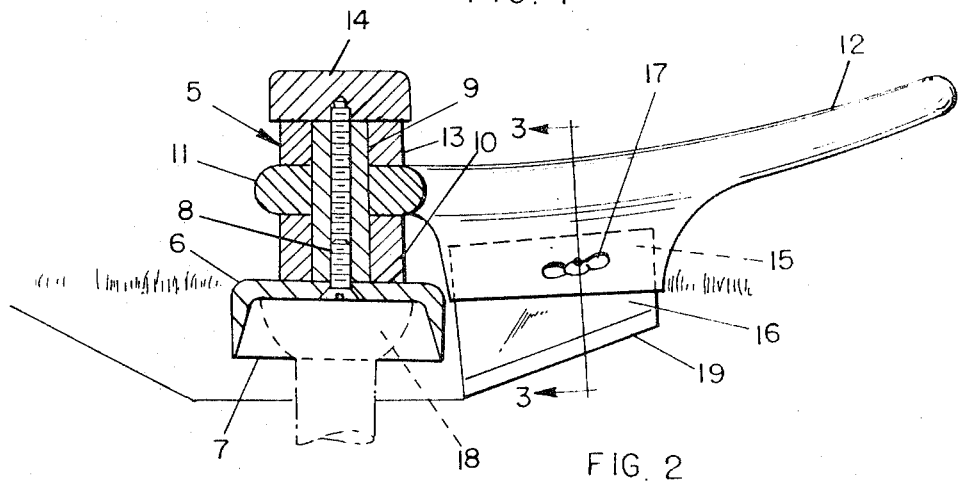
FIG. 2 is a sectional view of this invention, taken substantially along line 2—2 of FIG. 1, and viewed in the direction indicated by the arrows. Neither the handle nor the trimmer blade are shown in section for reasons of clarity.

Looking first at FIG. 2 of the accompanying drawing, in order to fully understand the detailed construction of this invention, it will be seen that the lawn trimmer 5 consists of a sprinkler head cup 6 that is round when viewed from the top, and which has the configuration of an inverted U, when viewed in cross-section. The peripheral edge 7 of the aforesaid cup is seen to be wedge-shaped, when viewed in cross-section, as is shown in the aforesaid FIG. 2 of the drawing. A vertically disposed flat head screw 8 extends upward from the center of the cup 6 to pass through the shaft 9 over which is slipped the cylindrical spacer 10. The enlarged end 11 of the handle 12 and the second cylindrical spacer 13 are now slipped over the top of the shaft 9 on the upper end of the screw 8 on which is secured the knob 14. A downwardly extending blade holder 15 is integrally formed with the handle 12 in order to receive the upper end of the grass trimmer blade 16 which fits into an elongated recess in the blade holder. The blade 16 is secured in the blade holder by means of the screw and wing nut 17, thereby completing the construction of this novel lawn trimmer.

Attention is still directed to FIG. 2 of the accompanying drawing where it is seen that a depression is made in the ground around the aforesaid sprinkler head which is indicated in the drawing by the reference number 18. The purpose of the depression is to have the sprinkler head level with, or even slightly below the ground in order that a lawn mower may pass over the same when cutting the grass. The side of the depression is therefore thus formed at an angle. It is the grass on this angled side that is cut by this novel lawn trimmer 5, and for this reason, the lower edge 19 of the aforesaid grass cutter blade 16 is made the same angle as that of the depression in the ground. The grass cutter blade, therefore, has the side configuration as that of a trapezoid, although the blade can be of any desired side configuration since some lawns may have a differently shaped area around the sprinkler head, as will be understood by those experienced in the art.

Some sprinkler heads have an entirely different configuration from that illustrated in the accompanying drawing since they are made to throw a rotating spray of water on the lawn. Therefore, the aforesaid sprinkler head cup 6 of this invention is not to be limited to the configuration shown in the drawing since it can be configurated to fit on any type of lawn sprinkler head.

Figure 3:
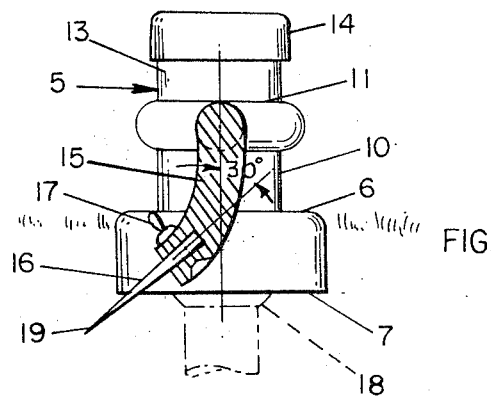
FIG. 3 is a sectional view of this invention, taken substantially along line 3—3 of FIG. 2, and viewed in the direction indicated by the arrows.

Attention is particularly called to FIG. 3 of the accompanying drawing. Here it is seen that the aforesaid blade holder 15 is formed at such an angle as to hold the grass trimmer blade at approximately thirty degrees to the handle 12 although this angle is a matter of choice for the manufacturer to decide. In fact, this invention can be so constructed that the just-mentioned angle may be changed, if it is so desired, by means of an adjusting screw. This alternate form of construction of this feature of the invention is not shown in any of the views of the drawing.

Figure 1:
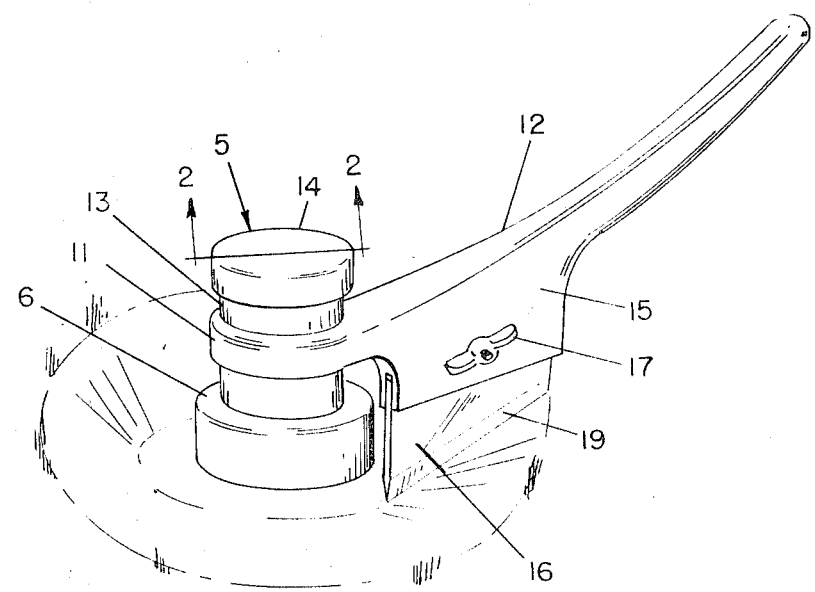
FIG. 1 is a pictorial view of this invention on the top of a sprinkler head ready for use. The sprinkler head is shown in phantom lines since it is not an actual part of this invention.

The way in which this invention is used is obvious from examination of FIGS. 1 and 2 of the drawing where it is seen that all one has to do is to place the sprinkler head cup 6 of this invention down on the top of the sprinkler head 18; then place one hand on top of the knob 14; take hold of the handle 12 in the other hand; and rotate the handle around the sprinkler head 18 in a clockwise direction, thus trimming the grass around the sprinkler head.

This invention is not only subject to changes and/or modifications already mentioned in this specification but also to any other changes and/or modifications one may care to make in the same in so long as the changes What I now claim as new and desire to secure by Letters Patent is:

1. A lawn trimmer for sprinkler heads, comprising a sprinkler head cup adapted to be placed on the top of a lawn sprinkler head; and structure projecting upward from the said cup, the said structure embodying a manually rotated handle projecting radially outward from the said structure, the said handle having a grass trimmer blade secured to the underside thereof, the said trimmer blade having its lower edge so configured as to trim the grass and the like around the said sprinkler head when the said handle is rotated, wherein the said structure embodies a vertically disposed screw passing through the center of the said sprinkler head cup; a shaft mounted on the said screw, the said shaft passing through a cylindrical spacer and one end of the said handle; a second cylindrical spacer; and a knob being screwed onto the upper end of the said screw.

2. The invention of claim 1, wherein the said handle has an integrally formed blade holder extending downward toward the grass that is to be trimmed, the said blade holder having an elongated recess in the lower edge thereof in which is located the upper portion of a trimmer blade that is secured in the said holder by means of a screw and wing nut or the like.

3. The invention of claim 2, wherein the said trimmer blade has the side configuration of a trapezoid.

4. The invention of claim 3, wherein the said sprinkler head cup has the configuration of an inverted letter U when viewed in cross-section; and the peripheral edge of the said sprinkler head cup being wedge-shaped when viewed in cross-section.

5. The invention of claim 4, wherein the said blade holder and said trimmer blade are located at a predetermined angle to the said handle.

6. The invention of claim 5, wherein the predetermined angle is approximately thirty degrees.

References Cited

UNITED STATES PATENTS

| | | | |
|---|---|---|---|
| 1,480,151 | 1/1924 | Cosman | 30—300X |
| 2,516,448 | 7/1950 | Canton | 30—310X |
| 2,670,537 | 3/1954 | Campbell | 30—310X |
| 2,723,453 | 11/1955 | Espitallier | 30—310 |

LESTER M. SWINGLE, Primary Examiner

J. C. PETERS, Assistant Examiner